United States Patent
Griffin et al.

(10) Patent No.: US 12,554,682 B2
(45) Date of Patent: *Feb. 17, 2026

(54) UPDATING EDGE NODES IN DISTRIBUTED COMPUTING ENVIRONMENTS USING PARTITIONS

(71) Applicant: RED HAT, INC., Raleigh, NC (US)

(72) Inventors: Leigh Griffin, Waterford (IE); Pierre-Yves Chibon, Saint-Pol-de-Léon (FR)

(73) Assignee: Red Hat, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/764,523

(22) Filed: Jul. 5, 2024

(65) Prior Publication Data
US 2024/0362188 A1 Oct. 31, 2024

Related U.S. Application Data

(63) Continuation of application No. 17/945,692, filed on Sep. 15, 2022, now Pat. No. 12,061,574.

(51) Int. Cl.
*G06F 9/44* (2018.01)
*G06F 9/4401* (2018.01)
(Continued)

(52) U.S. Cl.
CPC ............ *G06F 16/17* (2019.01); *G06F 9/4401* (2013.01); *G06F 9/5033* (2013.01)

(58) Field of Classification Search
CPC ....... G06F 16/17; G06F 9/4401; G06F 9/5033
See application file for complete search history.

(56) References Cited

U.S. PATENT DOCUMENTS

| 8,224,780 B2 * | 7/2012 | Cargille | G06F 16/1865 |
| | | | 707/648 |
| 8,825,602 B1 * | 9/2014 | Desai | G06F 16/178 |
| | | | 707/649 |

(Continued)

OTHER PUBLICATIONS

"Secure Firmware Update (FOTA) for Edge Devices", https://www.embien.com/secure-firmware-update-for-edge-devices, 2022; pp. 1-3.

(Continued)

*Primary Examiner* — Zahid Choudhury
(74) *Attorney, Agent, or Firm* — Kilpatrick Townsend & Stockton LLP

(57) ABSTRACT

Edge nodes in distributed computing environments can be updated according to some aspects described herein. For example, a first node in the distributed computing environment can receive an update request from a management node. The update request can include an update file for updating a second node. In response to receiving the update request, the first node can generate a first partition and a second partition, containing the update file, within the first node. Additionally, the first node can generate a network tunnel between the first node and the second node. The first node can mount a file system for the second node onto the first partition and a copy of the file system onto the second partition of the first node via the network tunnel. The first node also can update the file system in the second partition using the update file to generate an updated file system.

20 Claims, 3 Drawing Sheets

(51) Int. Cl.
*G06F 9/50* (2006.01)
*G06F 16/17* (2019.01)

(56) References Cited

U.S. PATENT DOCUMENTS

| | | | |
|---|---|---|---|
| 9,612,924 B1* | 4/2017 | Joseph | G06F 11/203 |
| 9,645,950 B2* | 5/2017 | Clark | G06F 3/0643 |
| 9,910,664 B2* | 3/2018 | Christopher | G06F 8/654 |
| 10,555,054 B2 | 2/2020 | Byers et al. | |
| 10,628,235 B2* | 4/2020 | Mageswaran | G06F 11/1076 |
| 10,693,720 B2 | 6/2020 | Frahim et al. | |
| 10,725,662 B2* | 7/2020 | Yu | G06F 3/0614 |
| 10,936,303 B2 | 3/2021 | Bonar et al. | |
| 11,132,126 B1* | 9/2021 | Chmiel | G06F 11/1466 |
| 11,579,864 B1* | 2/2023 | Ranger | G06F 8/65 |
| 11,768,672 B1* | 9/2023 | Silakov | G06F 8/71 |
| | | | 717/172 |
| 12,001,392 B2* | 6/2024 | Karthik | G06F 16/1752 |
| 2004/0205779 A1* | 10/2004 | Almeida | H04L 67/34 |
| | | | 719/321 |
| 2013/0276113 A1* | 10/2013 | Dalcher | G06F 11/00 |
| | | | 726/23 |
| 2018/0089206 A1* | 3/2018 | Tamura | G06F 16/128 |
| 2018/0089226 A1* | 3/2018 | Ben Dayan | G06F 16/188 |
| 2020/0117641 A1* | 4/2020 | Mitkar | G06F 16/1727 |
| 2020/0210243 A1* | 7/2020 | Li | G06F 9/5061 |
| 2021/0224054 A1 | 7/2021 | Sarkar et al. | |
| 2021/0279049 A1 | 9/2021 | Nolan et al. | |
| 2021/0326216 A1* | 10/2021 | Subramanian | G06F 3/0649 |
| 2021/0344556 A1 | 11/2021 | Zhao et al. | |
| 2022/0019422 A1 | 1/2022 | Anderson | |
| 2022/0107916 A1* | 4/2022 | Curtis-Maury | G06F 3/0643 |
| 2022/0317921 A1* | 10/2022 | Subramanian | G06F 3/0619 |
| 2023/0120522 A1* | 4/2023 | Bhandari | G06F 8/71 |
| | | | 726/4 |
| 2023/0131787 A1* | 4/2023 | Bono | H04L 41/08 |
| | | | 709/221 |
| 2023/0273904 A1* | 8/2023 | Srivas | G06F 8/658 |
| | | | 707/827 |
| 2023/0409235 A1* | 12/2023 | Das | G06F 3/061 |
| 2025/0208957 A1* | 6/2025 | Subramanian | G06F 16/182 |

OTHER PUBLICATIONS

"Software updates for IoT edge Linux devices", https://jfrog.com/connect/post/software-updates-for-iot-edge-linux-devices/, 2022; pp. 1-9.

* cited by examiner

UPDATING EDGE NODES IN DISTRIBUTED COMPUTING ENVIRONMENTS USING PARTITIONS

CROSS-REFERENCE TO RELATED APPLICATIONS

This is a continuation of U.S. patent application Ser. No. 17/945,692, entitled "UPDATING EDGE NODES IN DISTRIBUTED COMPUTING ENVIRONMENTS USING PARTITIONS," the entirety of which is incorporated herein by reference.

TECHNICAL FIELD

The present disclosure relates generally to distributed computing environments and, more particularly (although not necessarily exclusively), to updating edge nodes in distributed computing environments using partitions.

BACKGROUND

Distributed computing systems (e.g., cloud computing systems, data grids, and computing clusters) have recently grown in popularity given their ability to improve flexibility, responsiveness, and speed over conventional computing systems. In some cases, the responsiveness and speed of distributed computing systems can be further improved by employing edge-computing solutions. Edge computing is a networking philosophy focused on bringing computing power and data storage as close to the source of the data as possible to reduce latency and bandwidth usage. Distributed computing environments may employ edge nodes to perform various functions at the edge.

DETAILED DESCRIPTION

Figure 1:
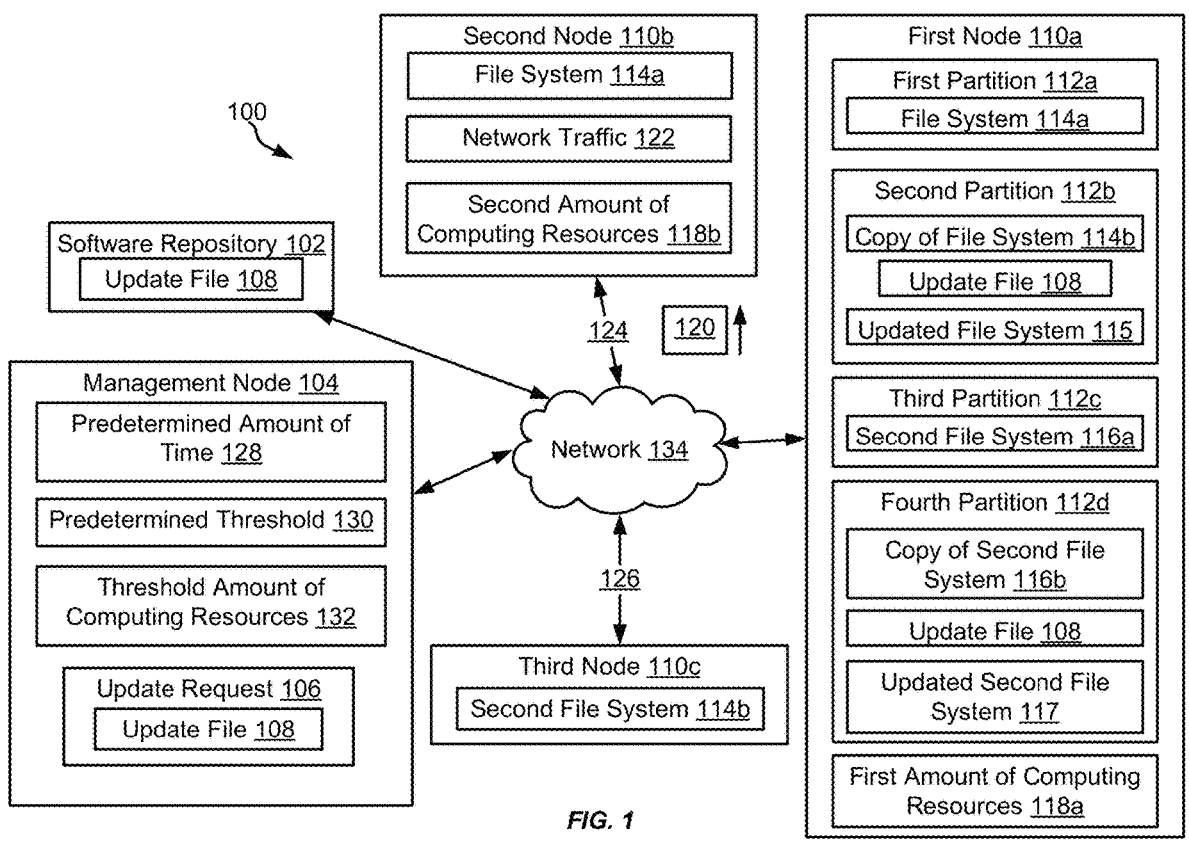
FIG. 1 is a block diagram of an example of a distributed computing environment for remotely updating a node using partitions according to one example of the present disclosure.

A distributed computing environment can include a cluster of edge nodes. An edge node can be a resource-constrained computing device with limited computing resources (e.g., processing power and memory). Such limited computing resources can cause difficulties in updating the edge node. For example, large updates to the edge node may drain the limited computing resources away from the main functionality of the cluster of edge nodes, negatively impacting the performance of the distributed computing system. Some edge nodes may be so resource constrained that they do not have any spare resources outside of their main function. For example, a file size of an update may be greater than available storage space in the edge node. Updating such edge nodes typically involves taking the edge node offline, removing the edge node from the distributed computing environment, and plugging the edge node into a separate computing device to perform the update. Removing edge nodes from the distributed computing environment for updates can significantly reduce performance of the distributed computing environment. Additionally, when running outdated software, the edge nodes can serve as an entry point for unauthorized user access, which can be a security concern.

Some examples of the present disclosure overcome one or more of the abovementioned problems by using a staging node to stage an update for an edge node by partitioning the first node. The staging node may have more computing resources than the edge node. For example, the staging node may have sufficient processing power, memory, and storage to facilitate the update for the edge node. To update the edge node, the file system of the edge node can be mounted onto a first partition of the staging node. The file system can be copied onto a second partition of the staging node and can be updated. Once the edge node is ready to be rebooted, the updated file system in the second partition can be mounted onto the edge node, fulfilling the update. In this way, the resource-constrained edge node can be seamlessly updated without requiring the edge node to be taken offline. Additionally, because the update is performed by the staging node, the edge node can perform its main functions without the computing performance of the distributed computing environment being negatively impacted.

In one particular example, a distributed computing environment can include a cluster of edge nodes managed by a management node. The management node can have administrative capability to examine network topology of the distributed computing system. The network topology can include an arrangement of elements, such as the cluster of edge nodes, in the distributed computing environment. The management node may receive an update request for a target edge node in the cluster. The management node may then identify a staging node within the distributed computing environment that can fulfill the update request for the target edge node. For example, the management node may use a set of criteria that relate to performance capability of the staging node, such as adequate storage space or network bandwidth for performing the update. The staging node may have more computing resources than the target edge node, enabling the staging node to facilitate the update request.

The staging node can initiate a network connection with the target edge node to mount a file system from the target edge node to the first node. Additionally, the staging node may generate at least two partitions. The file system from the target edge node can be mounted remotely to a first partition in the staging node. A copy of the file system can be mounted in a second partition in the staging node. The network connection can include a network tunnel through which the file system in the first partition is synchronized with the file system in the target edge node. Meanwhile, the staging node can update the copy of the file system in the second partition based on the update request. The target edge node may continue existing operations using the file system in the first partition until a reboot command is executed. The rebooted edge node can load the updated copy of the file system in the second partition, rather than the original file system in the first partition.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a distributed computing environment 100 for remotely updating a node 110a-c using partitions 112a-d according to one example of the present disclosure. Components within the distributed computing environment 100 may communicate using a network 134, such as the Internet or other suitable wide area network. The distributed computing environment 100 can include a software repository 102, a management node 104, and nodes 110a-c. Examples of the nodes 110a-c can include routers, sensors, controllers, or other suitable edge devices. At least one of the nodes 110a-c, such as second node 110b, can be an edge node that is located physically close to a client device or a data store in the distributed computing environment 100, such as the software repository 102. The second node 110b may be a resource constrained device, such as a microcontroller, a smart device, or a sensor.

The management node 104 can manage the nodes 110a-c in the distributed computing environment 100. Managing the nodes 110a-c can include authorizing updates for the nodes 110a-c, reviewing computing privileges for the nodes 110a-c, or other suitable administrative management. Additionally, the management node 104 can tabulate existing software versions for each node of the nodes 110a-c. The management node 104 can access the software repository 102 to compare the existing software versions executing on the nodes 110a-c with released software versions from the software repository 102. Using the released software versions, the management node 104 can determine that an existing software version on the second node 110b is outdated compared to the released software versions. The management node 104 can generate an update request 106 for updating the existing software version to the released software version. The update request 106 can include an update file 108 that can be used to update the second node 110b. The update file 108 can provide an update for a software package, an operating system, or other suitable computing service. In some examples, the management node 104 can receive the update request 106 including the update file 108 from the software repository 102.

In some examples, it may be difficult or impossible for the second node 110b to execute the update request 106, such as due to a lack of computing resources. Rather than transmitting the update request 106 to the second node 110b, the management node 104 can identify a separate node in the distributed computing environment 100 that can execute the update request 106. For example, the management node 104 can identify the first node 110a as being able to execute the update request 106. Using the first node 110a to stage the update request 106 for the second node 110b can shift computing resource usage and potential security risks for the update request 106 to the first node 110a.

The management node 104 may identify the first node 110a based on certain criteria. For example, the management node 104 may determine that the first node 110a has the network capability to communicate with the second node 110b. The capability can include available network bandwidth or network permissions. Additionally, the management node 104 can identify that the first node 110a includes a first amount of computing resources 118a that is greater than a second amount of computing resources 118b for the second node 110b. The management node 104 can determine that the first amount of computing resources 118a exceeds a threshold amount of computing resources 132 that is required to stage the update for the second node 110b. Examples of computing resources 118a-b can include processing power, memory, storage space, or the like. In some examples, the first node 110a may be an edge node.

After identifying that the first node 110a can fulfill the update request 106 for the second node 110, the management node 104 can transmit the update file 108 to the first node 110a. Accordingly, the first node 110a can receive an update request 106 containing the update file 108 from the management node 104. In some examples, the management node 104 may authorize the first node 110a to execute the update request 106. For example, the management node 104 may authorize the first node 110a to have permissions for accessing or establishing connections with the second node 110b.

In response to receiving the update request 106 from the management node 104, the first node 110a can generate at least two partitions 112, such as a first partition 112a and a second partition 112b. The partitions 112a-b can be generated in a storage compartment, such as a hard drive or RAM, of the first node 110a. To process the update file 108, the first node 110a can validate the update file 108. Validating the update file can include checking for incongruences in the update file 108. The incongruences can be resolved by the first node 110a, the management node 104, or a combination thereof. Additionally, the first node 110a can unpack the update file 108. Unpacking the update file 108 can involve extracting files from a compressed file, such as a ZIP file.

The first node 110a can then generate a network tunnel 124 to communicatively couple the first node 110a with the second node 110b. The network tunnel 124 can be a first network tunnel of one or more network tunnels generated by the first node 110a. The first node 110a can mount a file system 114a from the second node 110b to the first partition 112a in the first node 110a. The file system 114a can include software that is to be updated with the update file 108. A copy of the file system 114a can also be mounted in the second partition 112b. The file system 114a in the first partition 112a can be synchronized with the file system 114a in the second node 110b via the network tunnel 124. For example, the second node 110b can continue to perform its typical functions, and any changes made to the file system 114a in the second node 110b can be updated in the file system 114a mounted to the first partition 112a of the first node 110a. The copy of the file system 114b may not be synchronized with the second node 110b. Instead, the copy of the file system 114b in the second partition 112b can be updated using the update file 108 to generate an updated file system 115. The second node 110b can load the updated file system 115 after a reboot is executed.

The first node 110a can receive a reboot command 120 from the management node 104 to transmit to the second node 110b to complete the update request 106. Alternatively, the management node 104 can directly transmit the reboot command 120 to the second node 110b. The management node 104 can determine timing to execute the reboot command 120 using characteristics of the second node 110b, such as an amount of network traffic 122 occurring for the second node 110b. If the second node 110b is relatively busy (e.g., actively fulfilling requests from client devices), it may be beneficial to delay rebooting the second node 110b until the second node 110b is less busy. For example, the management node 104 can determine that an amount of network traffic 122 for the second node 110b is lower than a predetermined threshold 130 before transmitting the reboot command 120 to the second node 110b. In some examples, the second node 110b may need to be updated by a certain time or within a certain time frame, regardless of the amount of network traffic 122. The management node 104 can determine that a predetermined amount of time 128 has been exceeded before transmitting the reboot command 120 to the second node 110b. For example, the management node 104 may transmit the reboot command 120 four hours after the first node 110a updates the copy of the file system 114b in the second partition 112b. Additionally, the management node 104 may transmit the reboot command 120 when the predetermined amount of time 128 has been exceeded to ensure that the reboot command 120 is executed at a specific time, such as midnight. Alternatively, the second node 110b may reboot prior to receiving the reboot command 120 from the management node 104. The rebooted second node 110b can mount the updated file system 115 from the second partition 112b rather than the file system 114a to complete the update request 106.

In some examples, the first node 110a can use the update file 108 to update multiple nodes. For example, the management node 104 may direct the first node 110a to update the third node 110c using the update file 108. The third node 110c can also be an edge node in the distributed computing environment 100. To update the third node 110c using the update file 108, the first node 110a can generate a third partition 112c and a fourth partition 112d. Additionally, the first node 110a can generate a second network tunnel 126 to mount a second file system 116a from the third node 110c to the third partition 112c of the first node 110a. A copy of the second file system 116b and the update file 108 can be stored in the fourth partition 112d. The first node 110a can generate an updated second file system 117 in the fourth partition 112d by updating the copy of the second file system 116b with the update file 108. The third node 110c can mount the updated second file system 117 after rebooting.

In examples in which the update request 106 is not completed, the first node 110a can transmit an update report to the management node 104. An incomplete update request 106 can result from a corrupted file system or any other computing issue related to the nodes 110a-c. For example, the update report can identify a subset of the nodes 110a-c that has not been updated. The subset of the nodes 110a-c can be considered outdated edge nodes. Additionally or alternatively, the first node 110a can mark the subset of the nodes 110a-c with an unsuccessful attribute. The unsuccessful attribute can indicate to the management node 104 that the subset of the nodes 110a-c is unbootable. The subset of the nodes 110a-c may have a computing incompatibility that prevents the subset of nodes 110a-c from booting the updated file system 115. Additionally or alternatively, the subset of the nodes 110a-c can lack capability to receive the update file 108 from the first node 110a.

In response to receiving the update report, the management node 104 can remove, isolate, or otherwise restrict computing access for the subset of the nodes 110a-c with respect to the distributed computing environment 100. By restricting the computing access, a risk for unauthorized access to the distributed computing environment via the subset of the nodes 110a-c is minimized. Additionally or alternatively, the management node 104 can remove computing privileges for the subset of the nodes 110a-c. Examples of the computing privileges can include access to the network 134 in the distributed computing environment, modification of one or more file systems, or other suitable administrative privileges.

Although FIG. 1 depicts a certain number and arrangement of components, this is for illustrative purposes and intended to be non-limiting. Other examples may include more components, fewer components, different components, or a different arrangement of the components shown in FIG. 1. It will also be appreciated that similar principles can be applied with respect to non-edge computing environments in other examples.

Figure 2:
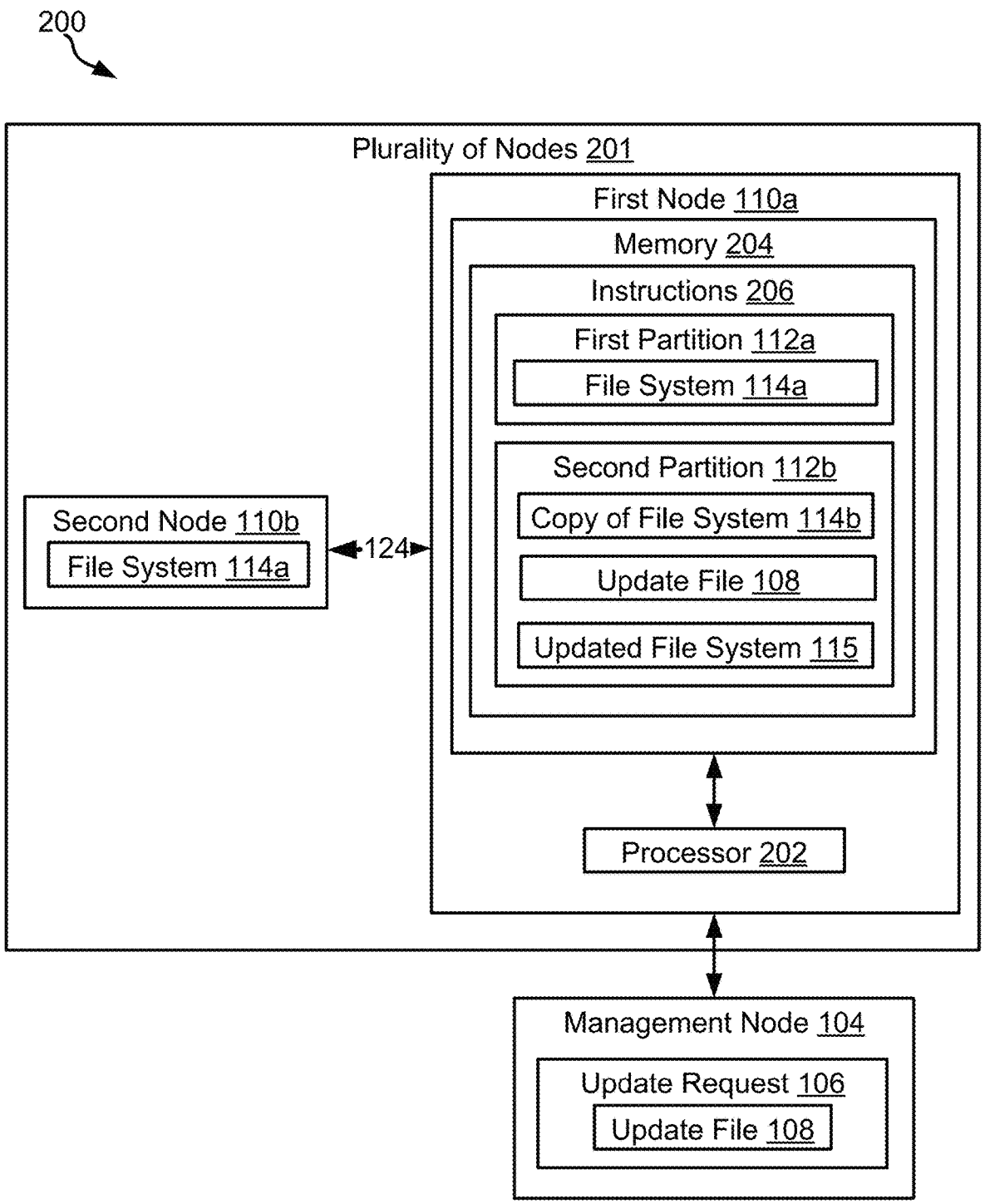
FIG. 2 is a block diagram of another example of a distributed computing environment for remotely updating a node using partitions according to one example of the present disclosure.

FIG. 2 is a block diagram of another example of a distributed computing environment 200 for remotely updating a node 110a-b using partitions 112a-b according to one example of the present disclosure. The distributed computing environment depicted in FIG. 2 includes a processor 202 communicatively coupled with a memory 204. As depicted in FIG. 2, the processor 202 and the memory 204 can be part of an edge node, such as a first node 110a.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in any suitable computer-programming language, such as C, C++, C #, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory can include a non-transitory computer-readable medium from which the processor 202 can read instructions 206. The non-transitory computer-readable medium can include electronic, optical, magnetic, or other storage devices capable of providing the processing device with computer-readable instructions or other program code. Examples of the non-transitory computer-readable medium include magnetic disk(s), memory chip(s), ROM, RAM, an ASIC, a configured processor, optical storage, or any other medium from which a computer processor can read the instructions 206.

In some examples, the processor 202 can execute the first node 110a to receive an update request 106 from a management node 104. The update request 106 can include an update file 108 for updating a second node 110b from a plurality of nodes 201 in the distributed computing environment. In response to receiving the update request 106, the first node 110a can generate a first partition 112a and a second partition 112b within the first node 110a. The second partition 112b can store the update file 108. To establish a communicative connection between the first node 110a and the second node 110b, the first node 110a can generate a network tunnel 124.

Through the network tunnel 124, a file system 114a for the second node 110b can be mounted onto the first partition 112a of the first node 110a. A copy of the file system 114b can be included in the second partition 112b. The first node 110a can update the file system 114b in the second partition 112b using the update file 108 to generate an updated file system 115. Before rebooting, the second node 110b can run the file system 114a in the first partition 112a. After rebooting, the second node 110b can run the updated file system 115 in the second partition 112b.

Figure 3:
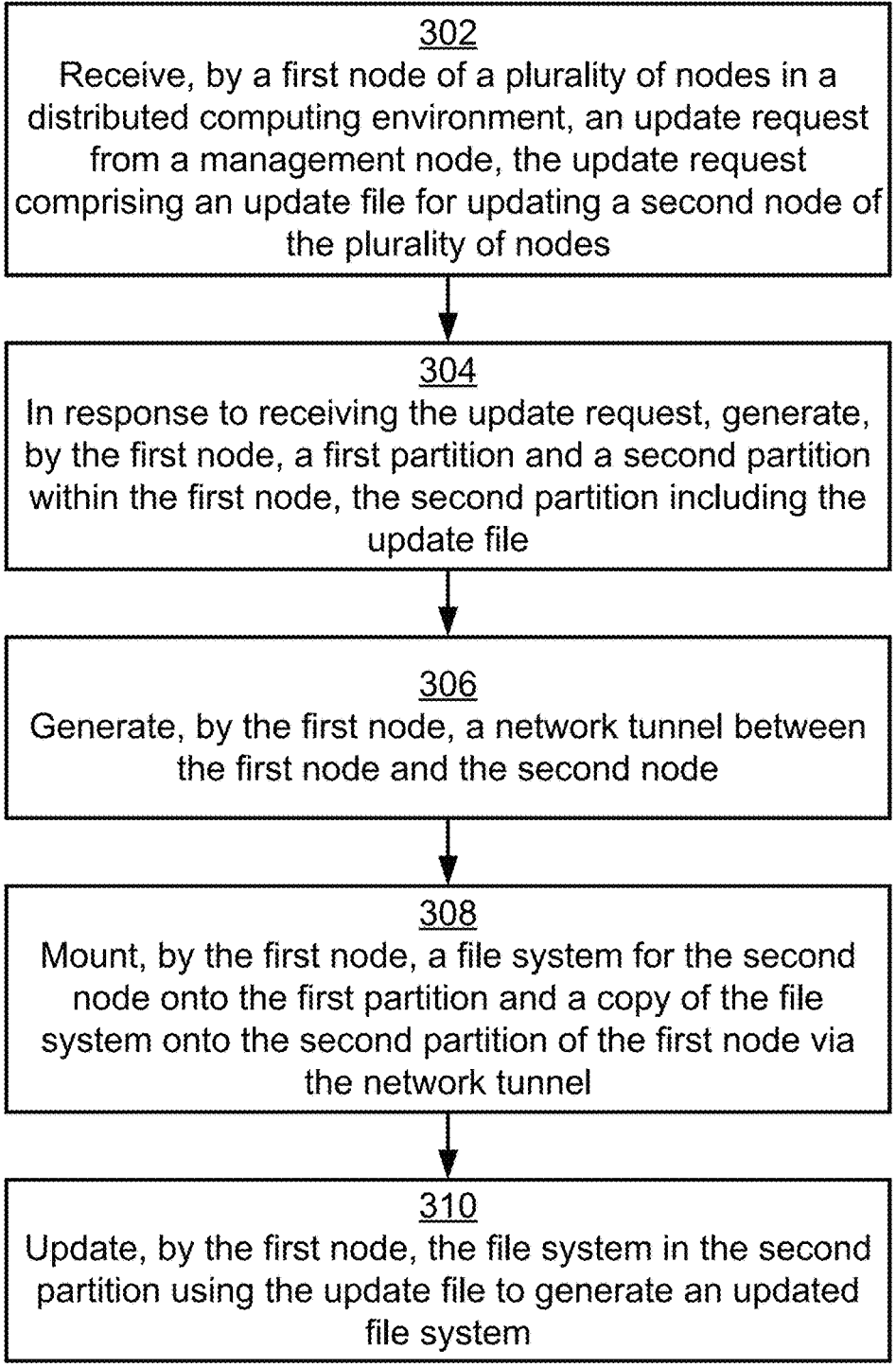
FIG. 3 is a flowchart of a process for remotely updating nodes in a distributed computing environment using partitions according to one example of the present disclosure.

FIG. 3 is a flowchart of a process for remotely updating nodes 110a-c in a distributed computing environment 200 using partitions 112a-b according to one example of the present disclosure. FIG. 3 is described with references to components in FIGS. 1-2. Other examples can include more steps, fewer steps, different steps, or a different order of the steps than is depicted in FIG. 3.

At block 302, a first node 110a from one or more edge nodes in a distributed computing environment receives an update request 106 from a management node 104. The update request 106 can include an update file 108 for updating a second node 110b. The update file 108 can update a file system 114a for the second node 110b. Examples of the file system 114a can include a software system, operating system, flash file systems, database file systems, or network file systems. The management node 104 can select the first node 110a from the one or more edge nodes using a set of criteria. The set of criteria can include amount of available computing resources, communication capabilities, or other suitable criteria with respect to the capability of the first node for performing the update for the second node.

At block 304, in response to receiving the update request, the first node 110a generates a first partition 112a and a second partition 112b within the first node 110a. The first partition 112a and the second partition 112b can be partitions of a storage system, such as a memory 204, for the first node 110a. The second partition 112b can include the update file 108 that will be used to update the file system 114a of the second node 110b. The first partition 112a may include adequate storage space for mounting the file system 114a for the second node 110b. The second partition 112b may include adequate storage space for updating the file system 114a using the update file 108.

At block 306, the first node 110a generates a network tunnel 124 between the first node 110a and the second node 110b. The network tunnel 124 can communicatively couple the first node 110a with the second node 110b. In some examples, the network tunnel 124 can be generated through a public network connection. Alternatively, the network tunnel 124 can be generated through a private network connection. The management node 104 may grant permissions to the first node 110a to allow the first node 110a to generate the network tunnel 124 to access the second node 110b. In some examples, data that is transferred through the network tunnel 124 can be protected via encryption. The first node 110a may receive encryption keys for decrypting data transmitted via the encrypted network tunnel 124.

At block 308, the first node 110a mounts the file system 114a for the second node 110b onto the first partition 112a and a copy of the file system 114b onto the second partition 112b of the first node 110a via the network tunnel 124. The file system 114a may be mounted remotely. The file system 114a mounted onto the first partition 112a can be synchronized with the file system 114a in the second node 110b as the second node 110b continues normal operation. For example, the second node 110b can generate one or more files within the file system 114a for the second node 110b by processing data. The data can be received from a storage device in the distributed computing environment 200, a client device, or the like. The one or more files can be included in the file system 114a mounted onto the first partition 112a after synchronization with the file system 114a in the second node 110b. The copy of the file system 114b in the second partition 112b may be inaccessible to the second node 110b.

At block 310, the first node 110a updates the copy of the file system 114b in the second partition 112b using the update file 108 from the second partition 112b. To update the file system 114a, the copy of the file system 114b in the second partition 112b can incorporate the update file 108 to generate an updated file system 115. Updating the copy of the file system 114b in the second partition 112b instead of the file system 114a in the second node 110b can provide relatively high fault resistance. For example, an error occurring during or after updating the copy of the file system 114b in the second partition 112b can be isolated from affecting the file system 114a in the second node 110b. Using the network tunnel 124, the first node 110a can synchronize an updated file system 115 with the file system 114a in the second node 110b. The updated file system 115 can be the copy of the file system 114b that includes the update file 108. Synchronizing the updated file system 115 with the file system 114a in the second node 110b can occur after the second node 110b reboots. The first node 110a can close the network tunnel 124 after the file system 114a in the second node 110b reboots using the updated file system 115.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    a processor; and
    a memory including instructions that are executable by the processor for causing the processor to perform operations comprising:
        generating, by a first node of a plurality of nodes in a distributed computing environment, a first partition and a second partition within the first node, the second partition including an update file for updating a second node of the plurality of nodes;
        mounting, by the first node, a file system for the second node onto the first partition and a copy of the file system onto the second partition of the first node; and
        updating, by the first node, the copy of the file system in the second partition using the update file to generate an updated file system.

2. The system of claim 1, wherein the operations further comprise:
    generating, by the first node, a network tunnel between the first node and the second node; and
    mounting the file system for the second node onto the first partition and the copy of the file system onto the second partition of the first node via the network tunnel.

3. The system of claim 2, wherein the second node is configured to access the file system in the first partition via the network tunnel prior to updating the file system in the second partition, and wherein the operations further comprise:
    subsequent to updating the file system, closing the network tunnel between the first node and the second node.

4. The system of claim 1, wherein the operations further comprise:
    transmitting a reboot command to the second node subsequent to updating the file system in the second partition of the first node, wherein the second node is configured to reboot to include the updated file system in response to receiving the reboot command.

5. The system of claim 4, wherein the operations further comprise, subsequent to updating the copy of the file system:
    determining that a predetermined amount of time has been exceeded; and
    in response to determining that the predetermined amount of time has been exceeded, transmitting the reboot command to the second node.

6. The system of claim 4, wherein the operations further comprise, subsequent to updating the copy of the file system:
   determining that an amount of network traffic for the second node is lower than a predetermined threshold; and
   in response to determining that the amount of network traffic for the second node is lower than the predetermined threshold, transmitting the reboot command to the second node.

7. The system of claim 1, wherein the operations further comprise:
   generating a third partition and a fourth partition in the first node, the fourth partition including the update file;
   generating a second network tunnel between the first node and a third node;
   mounting, via the second network tunnel, a second file system for the third node onto the third partition and a copy of the second file system onto the fourth partition in the first node; and
   updating the second file system in the fourth partition using the update file to generate an updated second file system.

8. A method comprising:
   generating, by a first node of a plurality of nodes in a distributed computing environment, a first partition and a second partition within the first node, the second partition including an update file for updating a second node of the plurality of nodes;
   mounting, by the first node, a file system for the second node onto the first partition and a copy of the file system onto the second partition of the first node; and
   updating, by the first node, the copy of the file system in the second partition using the update file to generate an updated file system.

9. The method of claim 8, further comprising:
   generating, by the first node, a network tunnel between the first node and the second node; and
   mounting the file system for the second node onto the first partition and the copy of the file system onto the second partition of the first node via the network tunnel.

10. The method of claim 9, further comprising, prior to updating the file system in the second partition:
    accessing, by the second node, the file system in the first partition via the network tunnel; and
    subsequent to updating the file system, closing the network tunnel between the first node and the second node.

11. The method of claim 8, further comprising:
    transmitting a reboot command to the second node subsequent to updating the file system in the second partition of the first node, wherein the second node reboots to include the updated file system in response to receiving the reboot command.

12. The method of claim 11, further comprising, subsequent to updating the copy of the file system:
    determining that a predetermined amount of time has been exceeded; and
    in response to determining that the predetermined amount of time has been exceeded, transmitting the reboot command to the second node.

13. The method of claim 11, further comprising, subsequent to updating the copy of the file system:
    determining that an amount of network traffic for the second node is lower than a predetermined threshold; and
    in response to determining that the amount of network traffic for the second node is lower than the predetermined threshold, transmitting the reboot command to the second node.

14. The method of claim 8, further comprising:
    generating a third partition and a fourth partition in the first node, the fourth partition including the update file;
    generating a second network tunnel between the first node and a third node;
    mounting, via the second network tunnel, a second file system for the third node onto the third partition and a copy of the second file system onto the fourth partition in the first node; and
    updating the second file system in the fourth partition using the update file to generate an updated second file system.

15. A non-transitory computer-readable medium comprising program code executable by a processor for causing the processor to perform operations comprising:
    generating, by a first node of a plurality of nodes in a distributed computing environment, a first partition and a second partition in the first node, the second partition including an update file for updating a second node of the plurality of nodes;
    mounting, by the first node, a file system for the second node onto the first partition and a copy of the file system onto the second partition of the first node; and
    updating, by the first node, the copy of the file system in the second partition using the update file to generate an updated file system.

16. The non-transitory computer-readable medium of claim 15, wherein the operations further comprise:
    generating, by the first node, a network tunnel between the first node and the second node; and
    mounting the file system for the second node onto the first partition and the copy of the file system onto the second partition of the first node via the network tunnel.

17. The non-transitory computer-readable medium of claim 15, wherein the operations further comprise:
    transmitting a reboot command to the second node subsequent to updating the file system in the second partition of the first node, wherein the second node is configured to reboot to include the updated file system in response to receiving the reboot command.

18. The non-transitory computer-readable medium of claim 17, wherein the operations further comprise, subsequent to updating the copy of the file system:
    determining that a predetermined amount of time has been exceeded; and
    in response to determining that the predetermined amount of time has been exceeded, transmitting the reboot command to the second node.

19. The non-transitory computer-readable medium of claim 17, wherein the operations further comprise, subsequent to updating the copy of the file system:
    determining that an amount of network traffic for the second node is lower than a predetermined threshold; and
    in response to determining that the amount of network traffic for the second node is lower than the predetermined threshold, transmitting the reboot command to the second node.

20. The non-transitory computer-readable medium of claim 15, wherein the operations further comprise:
    generating a third partition and a fourth partition in the first node, the fourth partition including the update file;

generating a second network tunnel between the first node and a third node;

mounting, via the second network tunnel, a second file system for the third node onto the third partition and a copy of the second file system onto the fourth partition in the first node; and updating the second file system in the fourth partition using the update file to generate an updated second file system.

* * * * *